(12) United States Patent
Matsushita et al.

(10) Patent No.: US 7,602,553 B2
(45) Date of Patent: Oct. 13, 2009

(54) WINDSHIELD AND HEAD-UP DISPLAY SYSTEM

(75) Inventors: Junichi Matsushita, Susono (JP);
Kunimitsu Aoki, Shizuoka (JP); Go Nakamura, Susono (JP)

(73) Assignee: Yazaki Corporation, Tokyo (JP)

( * ) Notice: Subject to any disclaimer, the term of this patent is extended or adjusted under 35 U.S.C. 154(b) by 10 days.

(21) Appl. No.: 11/984,017

(22) Filed: Nov. 13, 2007

(65) Prior Publication Data

US 2008/0112058 A1    May 15, 2008

(30) Foreign Application Priority Data

Nov. 13, 2006   (JP)   .............. 2006-306113

(51) Int. Cl.
| | | |
|---|---|---|
| G02B 27/14 | (2006.01) | |
| G09G 5/00 | (2006.01) | |
| H04N 7/00 | (2006.01) | |

(52) U.S. Cl. .............. 359/630; 345/7; 348/115
(58) Field of Classification Search ............. 340/980; 345/7; 348/115; 359/630
See application file for complete search history.

(56) References Cited

U.S. PATENT DOCUMENTS 7,532,175 B2 *   5/2009   Aoki et al. .............. 345/7

2002/0084950 A1   7/2002   Aoki et al.

FOREIGN PATENT DOCUMENTS

| JP | 2002-202475 | 7/2002 |
|---|---|---|
| JP | 2006-119384 | 5/2006 |

\* cited by examiner

Primary Examiner—David N Spector
(74) Attorney, Agent, or Firm—Edwards Angell Palmer & Dodge LLP (57) ABSTRACT

A windshield having a windshield body and a specific area, which is arranged at a part in a longitudinal direction of the windshield body and is formed into a curved surface having a curvature different from the curvature of the windshield body, is provided. The specific area is formed into a round shape in a plan view. The specific area has a projection area, on which a display light of an image displayed on a display device mounted in a vehicle is projected and the projection area is formed into a curved surface for displaying the projected image in a desired shape and is arranged outside of a surface of the windshield body, and a connection area, which is arranged around the projection area and is formed into a curved surface for continuing to the projection area and the windshield body. By using the windshield, the projection area can be formed into the windshield without an extra deformation.

3 Claims, 8 Drawing Sheets

WINDSHIELD AND HEAD-UP DISPLAY SYSTEM

The priority application Number Japan Patent Application No. 2006-306113 upon which this patent application is based is hereby incorporated by reference.

BACKGROUND OF THE INVENTION

1. Field of the Invention

The present invention relates to a windshield and a head-up display system having a projection area, which projects display light of an image displayed on a display device mounted in a vehicle.

2. Description of the Related Art

Recently, with an increase and diversification of information required by a driver during a drive, a projection-type display system called a head-up display (HUD) device is adopted so that information, which is required for increased visibility, is displayed on a windshield as a virtual image. Thereby, a driver can see the foreground of the vehicle through the windshield together with the virtual image, which is superimposed on the foreground.

In such a projection-type display system, a windshield on which a display image from a display device is projected has a non-planar surface. In addition, the curvature and the angle of inclination according to the horizontal plane (or vertical plane) are different depending on the position on the windshield. Therefore the virtual image projected on the windshield is distorted, thereby affecting the visibility of the virtual image.

The applicants propose a vehicle display apparatus described in a patent document 1. The vehicle display apparatus extracts a specific area, which can cancel out the distortion of an image arising from non-plane of the projection area, from a lens having a curved surface having a single radius of curvature. The projection area is regarded as a correction area, and a display light of the image, which is projected on the projection area of a windshield, is transmitted to the correction member. Thereby, the correction of the distorted virtual image can be accurately carried out with the inexpensive correction member.

In the patent document 2, a sectional shape of a specific area of a windshield in a vehicle is formed into an arbitrary place of a prescribed direction constantly. Thereby, a distortion of a virtual image can become small so that a cross-section (or longitudinal-section) is constant in an arbitrary place in an up and down direction (or a right and left direction).

Patent document 1:
Japan published patent application 2002-202475
Patent document 2:
Japan published patent application 2006-119384

SUMMARY OF THE INVENTION

In such a cited reference 2, it was believed to be able to simplify a shape of a correction member or various lenses, as a fresnel lens, used in a HUD device or to reduce frequency in use. However, when a specific area is formed into a square shape on a windshield, as in cited reference 2, the periphery of the specific area of the windshield causes a projection and a dent. As a result, it causes a distortion and a double image. Therefore, it is difficult to pass a safety glass examination for a vehicle prescribed by Japan Industrial Standard R3212, and it is difficult to achieve legally.

An object of the present invention to solve the above problem and to provide a windshield and a head-up display system, which can form the projection area without extra deformation in whole of a windshield.

According to a first aspect of the present invention, a windshield has a windshield body and a specific area. The specific area is arranged at a part in a longitudinal direction in the windshield body, and is formed into a curved surface having a curvature different from a curvature of the windshield body. The specific area is formed into a round shape in a plan view. The specific area has a projection area and a connection area. A display light of an image displayed on a display device mounted in a vehicle is projected on the projection area. The projection area is formed into a curved surface for displaying the projected image in a desired shape. The connection area is arranged around the projection area, at a position away from the projection area, and is formed into a curved surface continuing to the projection area and the windshield body.

According to a second aspect of the present invention, as mentioned above, the projection area is formed into a toroidal surface having different curvatures in vertical and horizontal directions.

According to a third aspect of the present invention, as mentioned above, the head-up display system has the windshield and a display device. The display device projects an image, which is displayed on the display device, on the projection area of the windshield in a vehicle.

According to the present invention, even if the specific area having the curved surface with a different curvature from that of the windshield body is formed by fitting it in the windshield body, by the connection area, an abrupt change of the curvature between the projection area and the windshield can be prevented. Also, the periphery of the projection area can be connected smoothly with the windshield body. Thereby, the projection area can be formed into the windshield body without extra deformation. Therefore, the specific area of shape suitable for a head-up display device of optical system can be formed into an arbitrary position of the windshield. As a result, a cause of a distortion and double image is solved, and quality of the display image can be improved. Also, it is not required to use a complex high-order, non-spherical surface in a lens and a mirror for using at the optical system of a head-up display device. Thereby, its configuration becomes simple and a cost can be reduced. Furthermore, design of the optical system can be made more freely. As a result, the image size can be increased, and an eye range position can be adjusted.

According to the present invention, by forming the shape of the projection area into a toroidal surface, the shape of the projection area can be approached in a surrounding shape of it. Thereby, the projection area can be formed without extra deformation into the windshield body. Furthermore, it is possible to fit and form the specific area into an arbitrary area of the windshield body. Thereby, the windshield can be designed more freely.

The above and other objects and features of this invention will become more apparent from the following description taken in conjunction with the accompanying drawings.

DETAILED DESCRIPTION OF EXEMPLARY EMBODIMENTS

In the following, a windshield and a head-up display (HUD) system according to a preferred embodiment of the present invention will be explained with reference to FIGS. 1-9.

Figure 1:
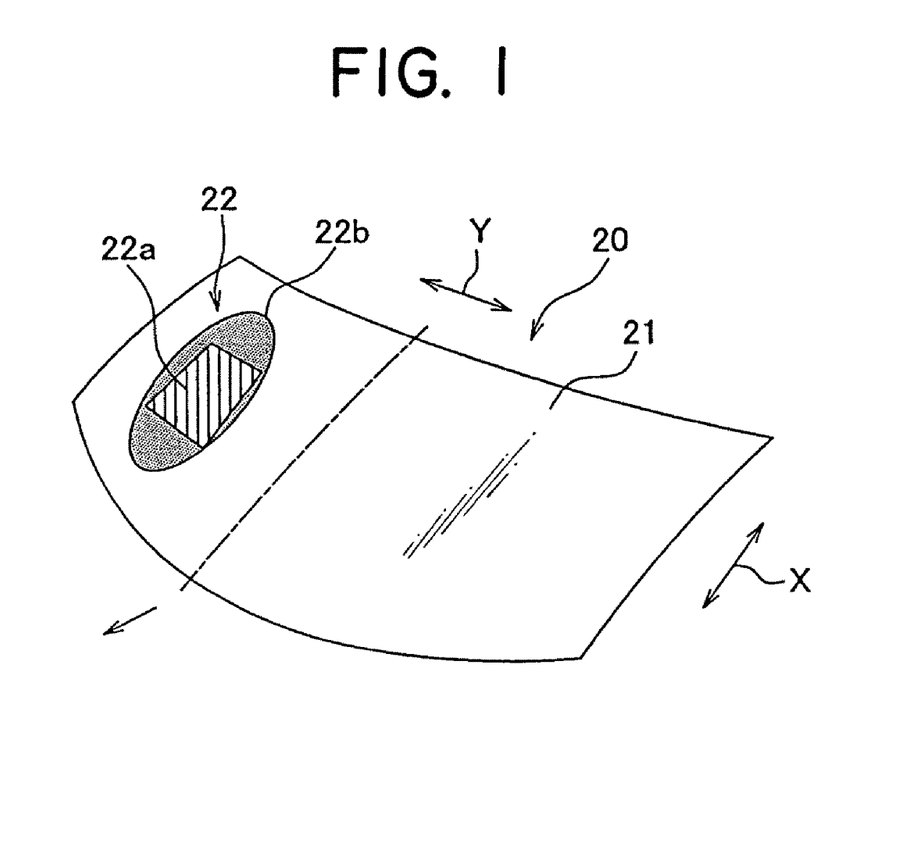
FIG. 1 is a perspective view showing a windshield for head-up display according to the present invention.
Figure 2:
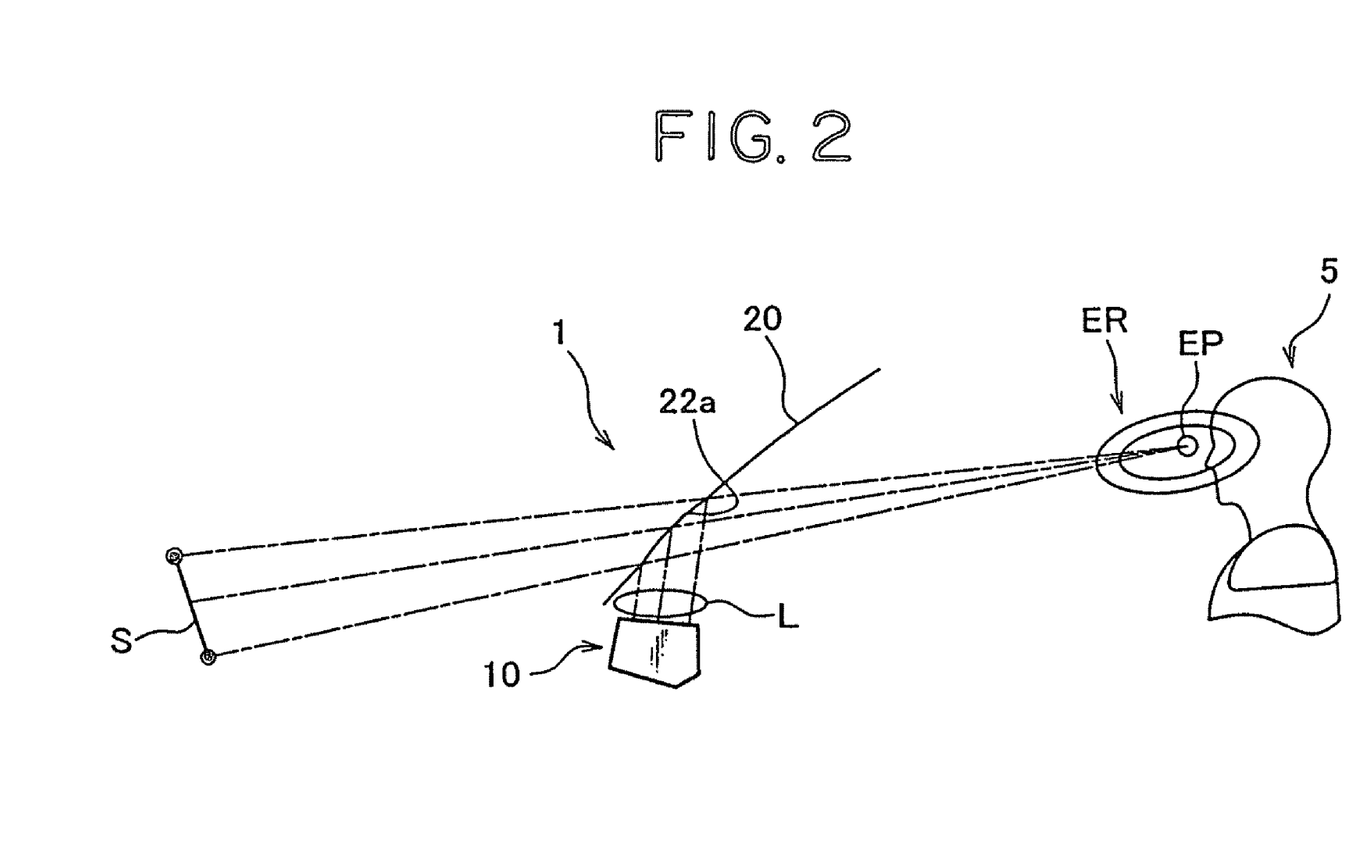
FIG. 2 is a block diagram showing concern with the head-up display system and a vehicle.
Figure 3:
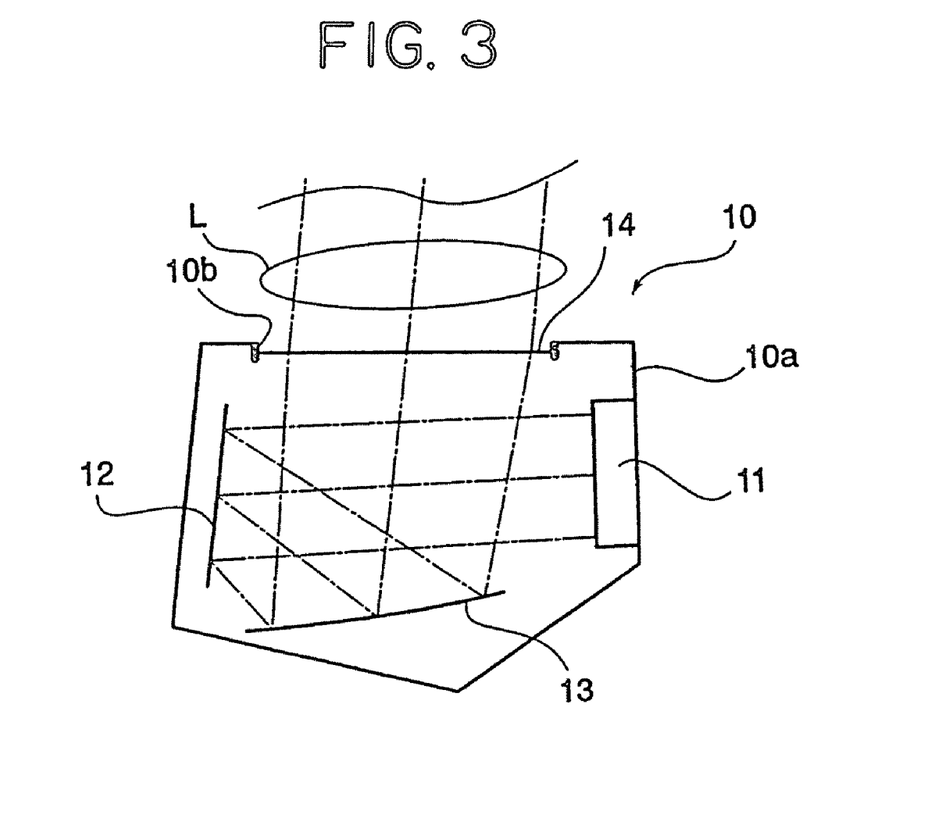
FIG. 3 is a block diagram showing configuration of a projector for the head-up display in FIG. 2.

As shown in FIG. 1-3, a HUD system 1 has a projector 10 for HUD received into an instrument panel of a vehicle (not shown) and a windshield 20 corresponding to the windshield of a vehicle.

As shown in FIG. 2, a virtual image S, which is projected on a projection area E of the windshield 20 for HUD from a opening of the instrument panel, and a foreground of a vehicle seen through the windshield 20 from an eye point EP of a driver 5 are together seen by a display light L of the projector 10 for HUD.

As shown in FIG. 2, the projector 10 for HUD includes a display positioning mechanism for adjusting a display position of an image so as to ensure a display sight even if the eye point EP of the driver 5 is moved into the eye range ER. For example, when the eye point EP of the driver 5 moves up and down in eye range ER, a display position of an image is adjusted back and forth by the display positioning mechanism. Thereby, an angle of depression in a direction seeing a display from the eye point EP is kept constant.

As shown in FIG. 3, the projector 10 for HUD has a display device 11, a flat surface mirror 12, a non-spherical surface mirror 13 and a cover 14. These are received in a receiving case 10a.

The display device 11 is used with a natural light device (such as a field emission display, fluorescent display tube and electroluminescence display) and a display device, such as a liquid crystal display with backlight. The display device 11 displays an image of supplementary information required for driving such as information for the direction of travel by the navigation system and running speed.

The flat surface mirror 12 is arranged against the display device 11, and reflects display light L of an image displayed by the display device 11 on the non-spherical surface mirror 13. The non-spherical surface mirror 13 is arranged in the bottom of the receiving case 10a, and reflects display light L from the flat surface mirror 12 on the cover 14. The transparent cover 14 covers an opening 1ob formed into a ceiling of the receiving case 10a, and is arranged against the non-spherical surface mirror 13, and is transmitted to display light L.

In such a constructed projector 10 for HUD, when an image is displayed on the display device 11, the display light L of the image is reflected by the flat surface mirror 12 and the non-spherical surface mirror 13. Thereafter, the display light L of the image is focused at the cover 14 and injected to the projection area. As a result, the display light L of the image is projected on the projection area, and then the driver 5 observes it as the virtual image S.

The flat surface mirror 12 and the non-spherical surface mirror 13 are explained in the projector 10 for HUD of embodiments when a catoptrics member is used. The embodiments of the present invention are not limited to them. The modifications and alternatives thereof are possible.

The windshield 20 has a windshield body 21 and a specific area 22. The specific area 22 is arranged at a part in a longitudinal direction of the windshield body 21, that is, a front of the driver's seat, and is formed into a curved surface of a curvature different from a curvature of the windshield body 21.

The windshield body 21 uses a laminated glass, IR cut glass or UV cut glass, and is formed into a curved surface shape which is curved in a lengthwise direction X and a longitudinal (laterally) direction Y by the outer shape of a vehicle. The curvature of the windshield body 21 is partly different in the lengthwise direction X and the longitudinal direction Y depending on the outer shape of the vehicle.

Figure 4:
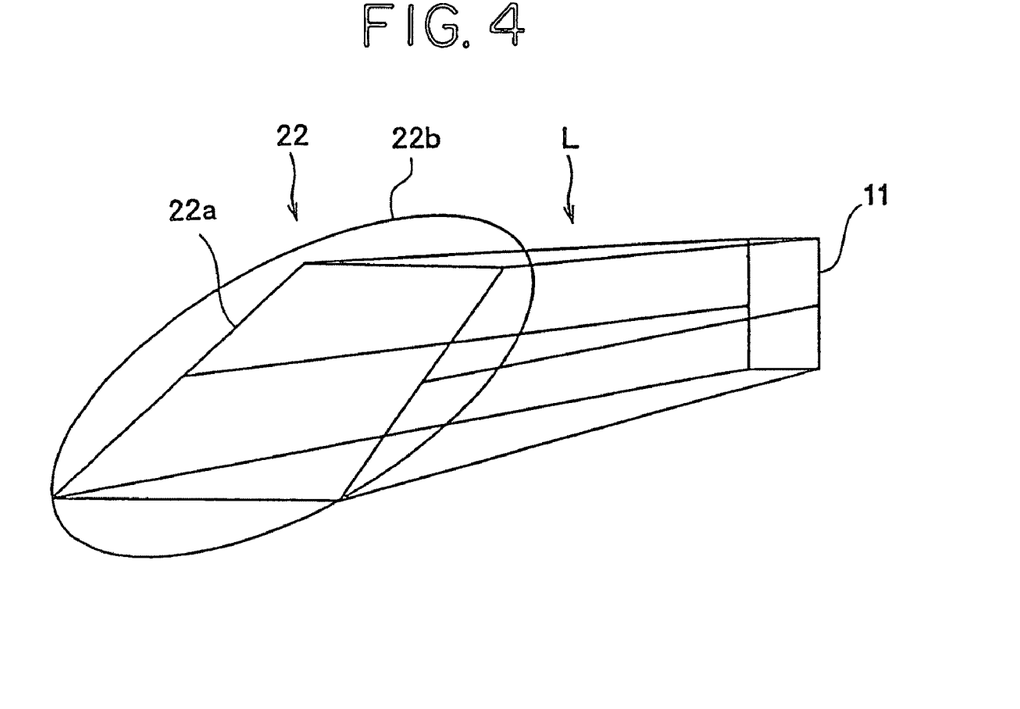
FIG. 4 is a drawing to illustrate a relation between a specific area and a projection area.

A flat surface shape of the specific area 22 is formed into a round shape. As shown in FIG. 4, the specific area 22 has a projection area 22a and a connection area 22b. A display light L from the display device 11 of the projector 10 is projected on the specific area 22a. The specific area 22a is formed into a curved surface which displays a projected image with a desired shape. The connection area 22b is arranged around the projection area 22.

The projection area 22a is formed into a curved surface which displays a projected image with a desired shape. Thereby, the image of the projector 10 for HUD, on which the display light L is projected, is free from distortion. That is, the projection area 22a is formed into the curved surface shape having a reflection characteristic which corrects the distortion of the image caused by the non-plane surface of the windshield body 21. An area of the projection area 22a is demarcated by the desired shape (for example, a shape of a display area of the display device, a shape of a image displayed in the display device 11 or a trapezoidal shape changed from a image of square).

The curved surface can be arbitrarily chosen from various curved surfaces, for example, a toroidal surface, a spherical surface, a non-spherical surface or a rotation curved surface. Embodiments of the present invention explain the projection area 22a formed into the toroidal surface so that a curvature of the toroidal surface is similar to a curvature of the windshield body 21.

Figure 5:
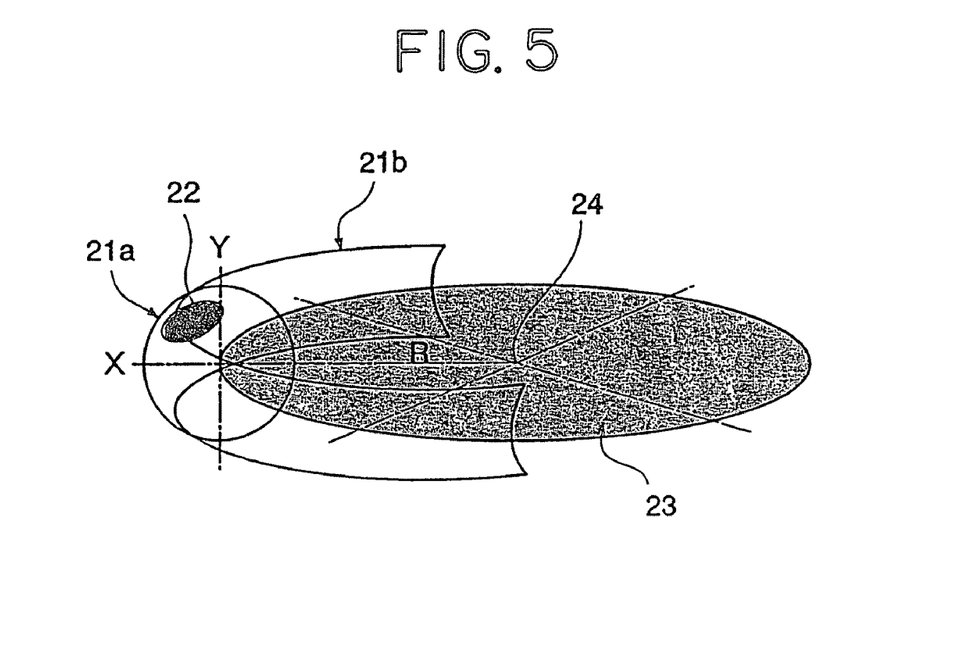
FIG. 5 is a drawing to illustrate a design method of the projection area in the specific area as an example.

As an example of a design method of the projection area 22a, as shown in FIG. 5, a shape of the projection area 22a is designed with a shape similar to that of the windshield body 21 based on X-Y axis, which is arranged from center 24 of a toroidal flat surface 23 to distance R, and a lengthwise direction 21a of the windshield body 21 and a sidewise direction 21b of it.

Figure 6:
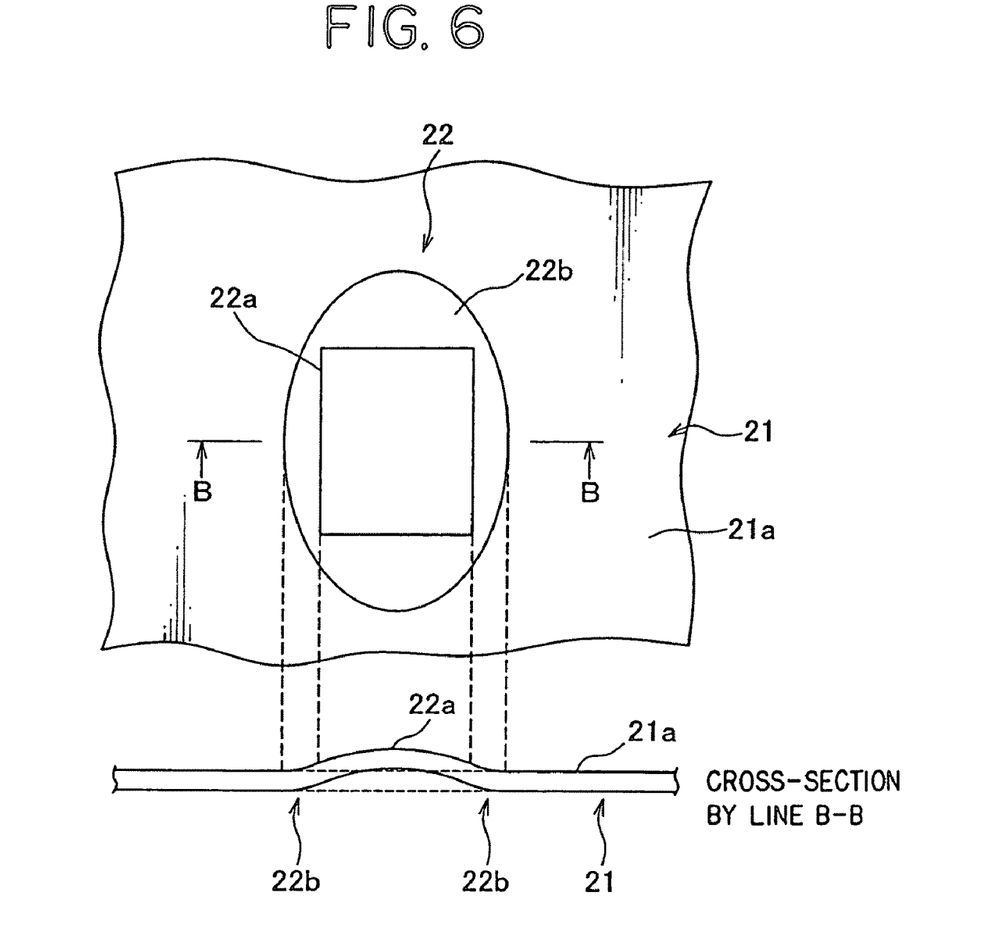
FIG. 6 is a drawing to illustrate the projection area of the specific area and a connection area as an example.

FIG. 6 is a view showing that part of the specific area 22 shown in FIG. 1 is increased, and a section of an arrow direction through the line B-B. As shown in FIG. 6, the connection area 22b is arranged around the projection area 22a so as to locate the projection area outside the windshield body 21 from the surface 21a. Furthermore, the connection area 22b is formed into a curved surface which continues to the projection area 22a and the windshield body 21. That is, the connection area 22b positions the projection area 22a to be projected from outside the virtual surface of the windshield body 21, as shown in a dotted line of FIG. 6. The connection area 22b can be an arbitrary shape, such as a curved surface or an inclined surface, when the connection area 22b connects the projection area 22a and the windshield body 21.

Figure 7A:
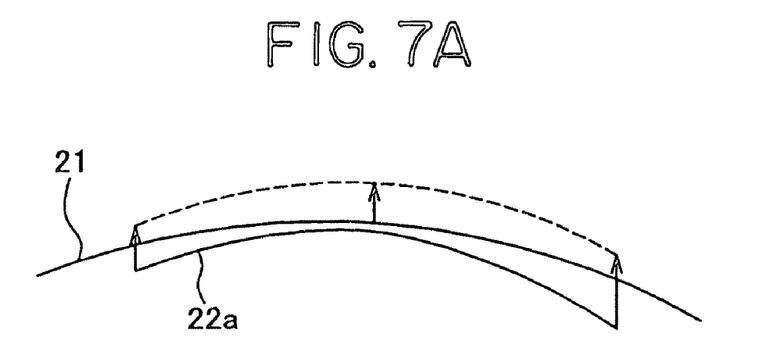
FIGS. 7A and 7B are drawings which illustrate a design method of the connection area of the specific area as an example.
Figure 7B:
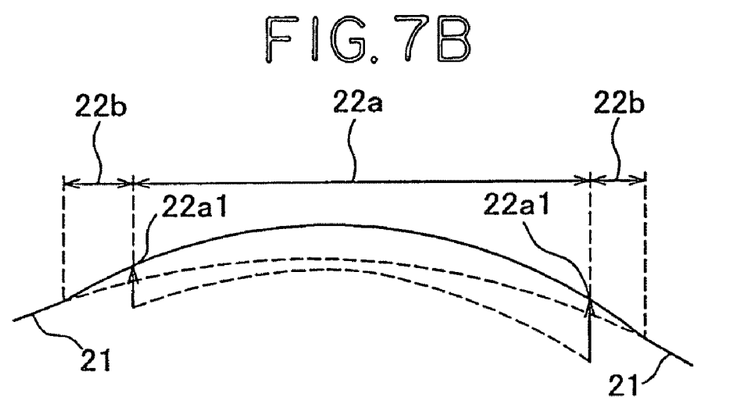

An example of a design method of the connection area 22b is explained by referring to FIGS. 7A and 7B. As shown in FIGS. 7A and 7B, when the curvature of the projection area 22a, which is different from the curvature of the windshield body 21, is inserted into the windshield body 21, an edge portion 22a1 of the projection area 22a is moved in the arrow direction shown in FIGS. 7A and 7B away from the surface of windshield body 21. The connection area 22b, which is formed into a curved surface continuing into the edge portion 22a1 of the projection area 22a and the windshield body 21, is designed so as to solve a cause of a distortion and to prevent a double image.

In several of the embodiments of the present invention, the projection area 22a is included in the specific area 22. Instead, the projection area 22a can be matched with the specific area 22. Also, the specific area 22 can be formed in all of the windshield body 21. Therefore, the present invention is not limited thereto.

Figure 8:
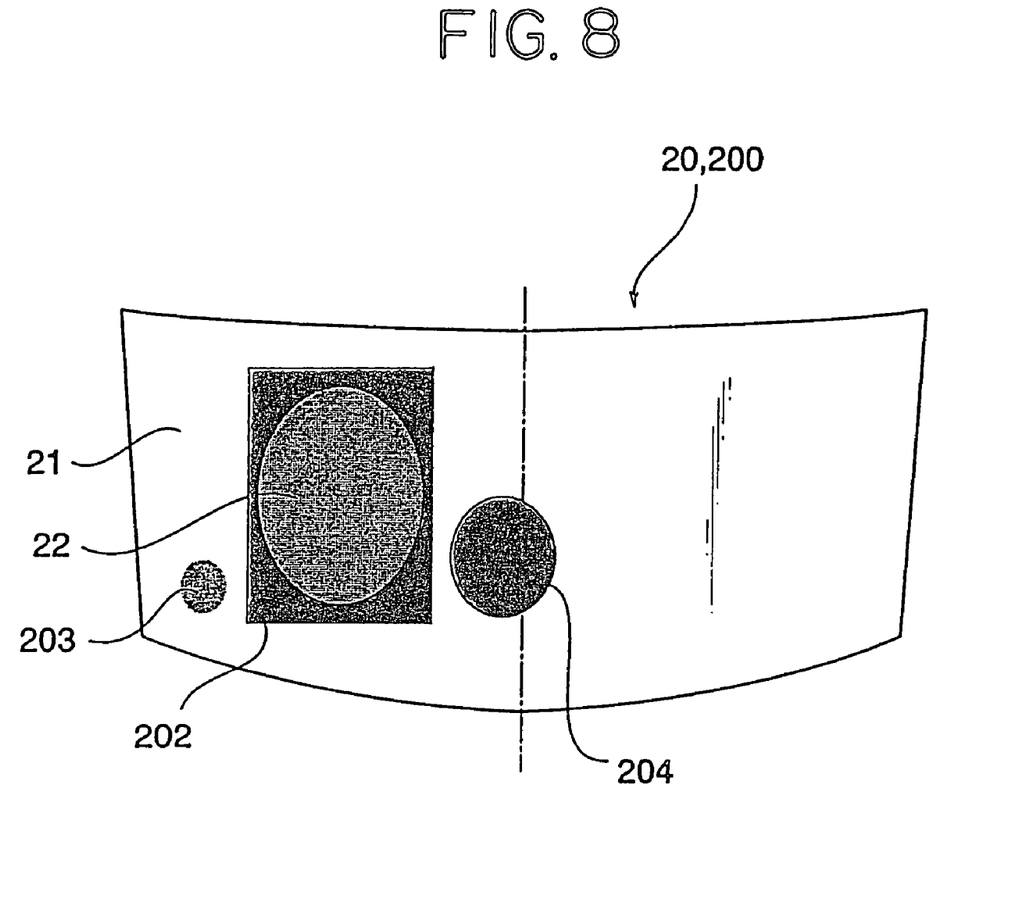
FIG. 8 is a drawing to illustrate a comparative result of the present invention and a conventional windshield.

A result for comparing the specific area of the windshield 20 of the above mentioned present invention and a conventional windshield 200 is explained with referring to FIG. 8.

In a conventional windshield 200, an area 202 is formed into a square shape. Thereby, depending on its unique curved surface shape, a projection 203 occurs in the side surface of the windshield 200, and a dent 204 occurs in the center of the windshield 200. However, in such the windshield 20 for HUD of the present invention, by forming the windshield 20 and the specific area 22 of a toroidal surface shape together, the projection 203 and the dent 204 can be prevented. There could check from a result of experiment and simulation.

Figure 9A:
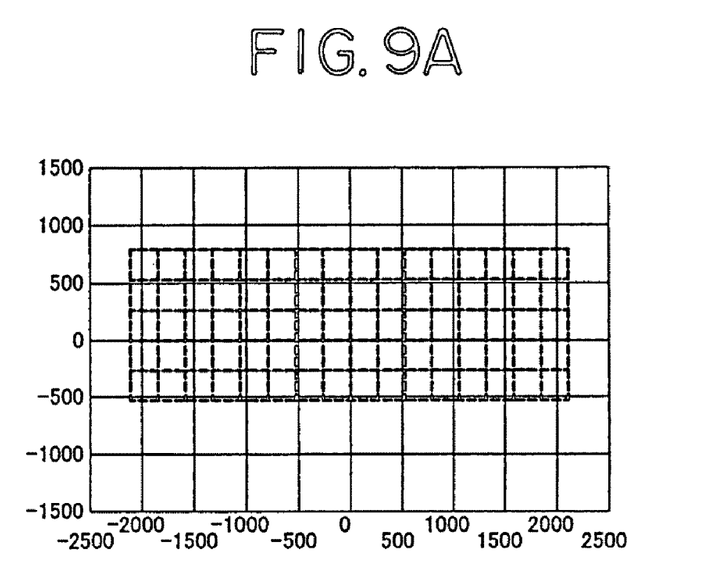
FIGS. 9A and 9B are drawings which show a simulation result of a display image projected on the windshield (FIG. 9A) of the present invention and the conventional windshield (FIG. 9B).
Figure 9B:
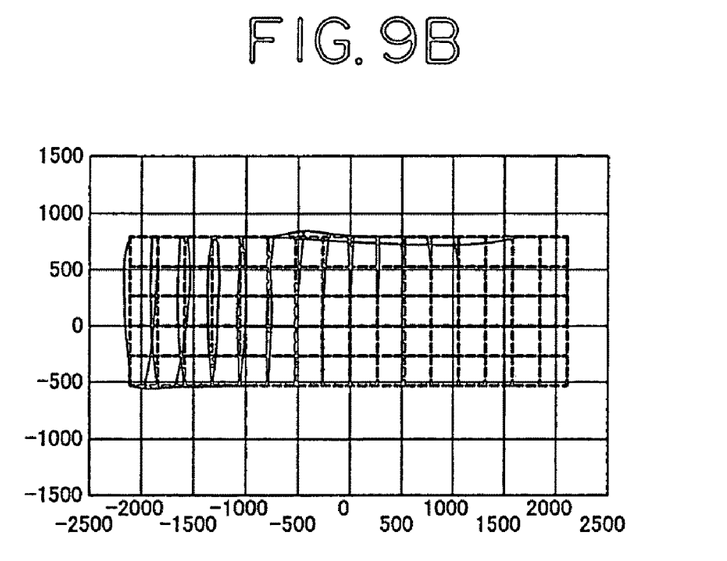

A simulated result of a display image (a virtual image) is shown in FIGS. 9A and 9B when the above mentioned projector 10 for HUD projects a display light L into the projection area 22a of the specific area 22 and the conventional windshield 200 shown in FIG. 8. FIGS. 9A and 9B show a display result for distance from each center in vertical and horizontal of the display image.

Simulation is used to imaging optics simulation software publicly known. This input parameter is that radius of X curvature is 4000 mm, radius of Y curvature is 8500 mm, X axial rotation is −59 degree, Y axial rotation is 4.5 degree and a korenich constant is 1.

When the above mentioned display light L is projected on the projection area 22a of the present invention, as shown in FIG. 9A, the display image is displayed in a square shape without a distortion. On the other hand, when the above mentioned display light L is projected on the conventional windshield 200, as shown in FIG. 9B, a part of center on the upper side and the left side of a display image is distorted. Therefore, by forming the specific area 22 as discussed previously, the display image of the projector 10 for HUD can be displayed on the windshield body 21 without a distortion. Furthermore, the windshield 20 can be produced without a distortion and double image shown in FIG. 8 in the windshield body 21.

According to the above mentioned windshield 20 for HUD, even if the specific area 22 is inserted into the windshield body 21 and formed, a rapid change of the curvature between the projection area 22a and the windshield body 21 can be prevented by the connection area 22b. Also, the periphery of the projection area 22a can be prevented from an inserting into the windshield body 21. Thereby, the projection area 22a can be formed in the windshield body 21 without extra deformation. Therefore, the specific area 22 of a shape suitable for the HUD unit 1 of optical system can be formed into an arbitrary position of the windshield. As a result, a cause of a distortion and double image is solved, and quality of the display image can be improved. Also, it is not required to use complex high-order non-spherical surface in a lens and a mirror for using at optical system of the head-up display device. Thereby, its configuration becomes simple and a cast can be reduced. In addition, design of the optical system can be made more freely. As a result, the image size can be increased, and an eye range position can be adjusted.

By forming a shape of the projection area 22a of the specific area 22 into a toroidal surface, the shape of the projection area 22a can be formed into a shape similar to its surroundings. Thereby, the specific area can be formed without extra deformation of the windshield 20. It is possible to fit and form the specific area 22 into an arbitrary area of the windshield body 21. Thereby, the windshield can design freely.

The embodiments of the present invention are only exemplary and not limited thereto. Any modification and alteration thereof are within the scope of the present invention.

What is claimed is:

1. A windshield comprising:
   a windshield body; and
   a specific area arrange at a part in a longitudinal direction of the windshield body, and formed into a curved surface having a different curvature from a curvature of the windshield body,
   wherein the specific area is formed into a round shape in a plan view, and
   the specific area comprises a projection area, on which a display light of an image displayed on a display device mounted in a vehicle is projected, and the projection area is formed into a curved surface for displaying the projected image in a desired shape, and the projection area is arranged away from a surface of the windshield body, and a connection area, which is arranged around the projection area and is formed into a curved surface for continuing to the projection area and the windshield body.

2. The windshield as claimed in claim 1, wherein the projection area is formed into a toroidal surface having different curvatures in vertical and horizontal directions, as the curved surface.

3. A head-up display system comprising:
   a windshield; and
   a display device projecting a image, which is displayed in the display device, on the projection area of the windshield in a vehicle,
   wherein the head-up display system has the windshield as claimed in claim 1.

* * * * *